US008416851B2

(12) United States Patent
Lee et al.

(10) Patent No.: US 8,416,851 B2
(45) Date of Patent: Apr. 9, 2013

(54) MOTION DETECTION FOR VIDEO PROCESSING (75) Inventors: Sang-hee Lee, Santa Clara, CA (US); Yi-jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1695 days.

(21) Appl. No.: 11/614,021

(22) Filed: Dec. 20, 2006

(65) Prior Publication Data

US 2008/0152194 A1  Jun. 26, 2008

(51) Int. Cl.
*G06K 9/00* (2006.01)

(52) U.S. Cl.
USPC ..................................... 375/240.12

(58) Field of Classification Search .................. 382/107, 382/233
See application file for complete search history.

(56) References Cited

U.S. PATENT DOCUMENTS

| 4,953,032 | A |   | 8/1990  | Suzaki et al. |           |
|-----------|---|---|---------|---------------|-----------|
| 5,557,684 | A | * | 9/1996  | Wang et al.   | 382/107   |
| 6,057,892 | A | * | 5/2000  | Borer         | 348/699   |
| 6,148,017 | A | * | 11/2000 | Borchert et al.| 372/50.1  |
| 2004/0086046 | A1 |   | 5/2004 | Ma et al.     |           |
| 2005/0041102 | A1 | * | 2/2005 | Bongiovanni et al. | 348/155 |
| 2006/0062299 | A1 |   | 3/2006 | Park et al.   |           |
| 2010/0118163 | A1 | * | 5/2010 | Matsugu et al.| 348/231.99|

FOREIGN PATENT DOCUMENTS

| WO | 97/04588 A1   | 2/1997 |
| WO | 2008079655 A1 | 7/2008 |

OTHER PUBLICATIONS

Haan, Gerard D., et al., "Deinterlacing—An Overview", Proceedings of the IEEE, vol. 86, No. 9, (Sep. 1998),1839-1857.

Kavelo, Ossi , et al., "Deinterlacing of video signals using nonlinear interpolation with simple motion compensation", Signal Processing Laboratorty, Tampere University of Technology, Finland, 4.1-4.6.

Koivunen, Tero , "Motion Detection of an Interlaced Video Signal", IEEE Transactions on Consumer Electronics, vol. 40, No. 3, (Aug. 1994),753-760.

Mehta, et al., "A simplified normal optical flow measurement CMOS camera", IEEE Transactions on Circuits and Systems I: Regular Papers, vol. 53, No. 6, Jun. 2006, pp. 1223-1234.

Feng, et al., "Complexity-based Rate Distortion Optimization with Perceptual Tuning for Scalable Video Coding", Image Processing, 2005. ICIP 2005 vol. 3, XP010851390, DOI: 10.1109/ICIP.2005. 1530322 ISBN: 978-0-7803-9134-5, Sep. 11, 2005, pp. 37-40.

International Preliminary Report and Written Opinion received for PCT Patent Application No. PCT/US2007/087022, mailed on Jul. 2, 2009, 6 pages.

(Continued)

*Primary Examiner* — Thai Tran
*Assistant Examiner* — Sunghyoun Park
(74) *Attorney, Agent, or Firm* — Kacvinsky Daisak PLLC (57) ABSTRACT

Various embodiments for performing motion detection for video processing are described. In one or more embodiments, motion detection may be performed by computing a temporal difference measurement, a local spatial complexity measurement, and a content dependent motion detection value based on the temporal difference measurement and the local spatial complexity measurement. In some implementations, the content dependent motion detection value may comprise a division of the temporal difference measurement by the local spatial complexity measurement. In other implementations, an approximated content dependent motion detection value may be computed without division to reduce computational complexity. The content dependent motion detection value may be used to perform various adaptive post-processing operations such as for de-interlacing, noise reduction, frame rate conversion, and so forth. Other embodiments are described and claimed.

20 Claims, 2 Drawing Sheets

OTHER PUBLICATIONS

International Search report and Written Opinion received for PCT Patent Application No. PCT/US2007/087022, mailed on May 15, 2008, 10 pages.

Office Action received for Chinese Patent Application No. 200780046830.6, mailed on Aug. 10, 2010, 9 pages including 4 pages of English Translation.

Office Action received for Chinese Patent Application No. 200780046830.6, mailed on Oct. 25, 2011, 8 pages including 4 pages of English translation.

Search report received for European Patent Application No. 07869097.1, mailed on Dec. 8, 2011, 3 pages.

Office Action received for European Patent Application No. 07869097.1, mailed on Dec. 27, 2011, 7 pages.

Office Action received for Taiwan Patent Application No. 96144526, mailed on Mar. 15, 2011, 6 pages including 1 page of English Translation.

Office Action received for Korean Patent Application No. 2009-7012623, mailed on Oct. 21, 2010, 3 pages of English translation.

* cited by examiner

MOTION DETECTION FOR VIDEO PROCESSING

BACKGROUND

Video processing is a key function in a video pipeline to display high quality video. Conventional motion detection methods are unable to deliver superior visual quality due to the failure to proper estimate the amount of motion in a video sequence. One of the major reasons for this failure is the use of frame difference without considering the local picture content. Accordingly, improved motion detection is needed for video processing to enhance the viewing experience of digital media.

DETAILED DESCRIPTION

Various embodiments are directed to performing motion detection for video processing. In one or more embodiments, motion detection may be performed by computing a temporal difference measurement, a local spatial complexity measurement, and a content dependent motion detection value based on the temporal difference measurement and the local spatial complexity measurement. In some implementations, the content dependent motion detection value may comprise a division of the temporal difference measurement by the local spatial complexity measurement. In other implementations, an approximated content dependent motion detection value may be computed without division to reduce computational complexity. The content dependent motion detection value may be used to perform various adaptive post-processing operations such as for de-interlacing, noise reduction, frame rate conversion, and so forth.

Figure 1:
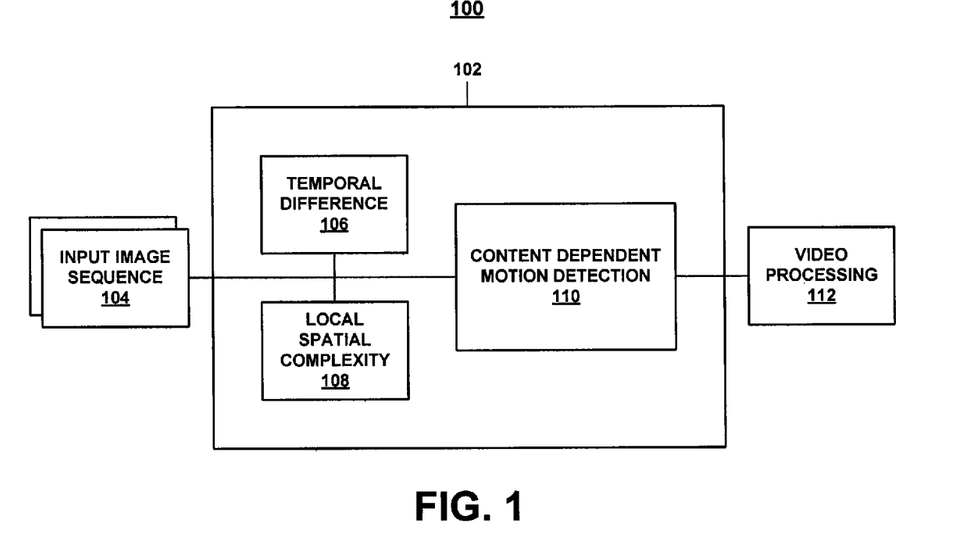
FIG. 1 illustrates a media processing system in accordance with one or more embodiments.

FIG. 1 illustrates a media processing system 100 in accordance with one or more embodiments. In general, the media processing system 100 may comprise various physical and/or logical components for communicating information which may be implemented as hardware, software, or any combination thereof, as desired for a given set of design parameters or performance constraints. Although FIG. 1 may show a limited number of components by way of example, it can be appreciated that a greater or a fewer number of components may be employed for a given implementation.

In various implementations, the media processing system 100 may be arranged to perform one or more networking, multimedia, and/or communications applications for a PC, consumer electronics (CE), and/or mobile platform. In some embodiments, the media processing system 100 may be implemented for a PC, CE, and/or mobile platform as a system within and/or connected to a device such as personal PC, STB, digital TV device, Internet Protocol TV (IPTV) device, digital camera, media player, and/or cellular telephone. Other examples of such devices may include, without limitation, a workstation, terminal, server, media appliance, audio/video (A/V) receiver, digital music player, entertainment system, digital TV (DTV) device, high-definition TV (HDTV) device, direct broadcast satellite TV (DBS) device, video on-demand (VOD) device, Web TV device, digital video recorder (DVR) device, digital versatile disc (DVD) device, high-definition DVD (HD-DVD) device, Blu-ray disc (BD) device, video home system (VHS) device, digital VHS device, a gaming console, display device, notebook PC, a laptop computer, portable computer, handheld computer, personal digital assistant (PDA), voice over IP (VoIP) device, combination cellular telephone/PDA, smart phone, pager, messaging device, wireless access point (AP), wireless client device, wireless station (STA), base station (BS), subscriber station (SS), mobile subscriber center (MSC), mobile unit, and so forth.

In mobile applications, for example, the media processing system 100 may be implemented within and/or connected to a device comprising one more interfaces and/or components for wireless communication such as one or more transmitters, receivers, transceivers, chipsets, amplifiers, filters, control logic, network interface cards (NICs), antennas, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the media processing system 100 may form part of a wired communications system, a wireless communications system, or a combination of both. For example, the media processing system 100 may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The media processing system 100 also may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be illustrated using a particular communications media by way of example, it may be appreciated that the principles and techniques discussed herein may be implemented using various communication media and accompanying technology.

In various embodiments, the media processing system 100 may be arranged to operate within a network, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless communications network configured to carry data in accordance with the described embodiments.

The media processing system 100 may be arranged to communicate one or more types of information, such as media information and control information. Media information generally may refer to any data representing content meant for a user, such as image information, video information, audio information, A/V information, graphical information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the media information and control information may be segmented into a series of packets. Each packet may comprise, for example, a discrete data set having a fixed or varying size represented in terms of bits or bytes. It can be appreciated that the described embodiments are applicable to any type of communication content or format, such as packets, frames, fragments, cells, windows, units, and so forth.

The media processing system 100 may communicate information in accordance with one or more protocols. A protocol may comprise a set of predefined rules or instructions for managing communication among nodes. In various embodiments, for example, the media processing system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The media processing system 100 may communicate information in accordance with one or more standards as promulgated by a standards organization, such as the International Telecommunications Union (ITU), the International Organization for Standardization (ISO), the International Electrotechnical Commission (IEC), the Institute of Electrical and Electronics Engineers (IEEE), the Internet Engineering Task Force (IETF), and so forth. In various embodiments, for example, the media processing system 100 may communicate information according to media processing standards such as, for example, the ITU/IEC H.263 standard (Video Coding for Low Bitrate Communication, ITU-T Recommendation H.263v3, published November 2000), the ITU/IEC H.264 standard (Video Coding for Very Low Bit Rate Communication, ITU-T Recommendation H.264, published May 2003), Motion Picture Experts Group (MPEG) standards (e.g., MPEG-1, MPEG-2, MPEG-4), Digital Video Broadcasting (DVB) terrestrial (DVB-T) standards, DVB satellite (DVB-S or -S2) standards, DVB cable (DVB-C) standards, DVB terrestrial for handhelds (DVB-H), National Television System Committee (NTSC) and Phase Alteration by Line (PAL) standards, Advanced Television Systems Committee (ATSC) standards, Society of Motion Picture and Television Engineers (SMPTE) standards such as the SMPTE 421M or VC-1 standard based on Windows Media Video (WMV) version 9, Digital Transmission Content Protection over Internet Protocol (DTCP-IP) standards, High performance radio Local Area Network (HiperLAN) standards, and so forth.

In some implementations, the media processing system 100 may be arranged to receive media content from a media source. The media source generally may comprise various devices and/or systems capable of delivering static or dynamic media content to the media processing system 100. In one embodiment, for example, the media source may comprise or form part of an image acquisition device such as a video camera or mobile device with imaging capabilities. The media source also may comprise a multimedia server arranged to provide broadcast or streaming media content. In other embodiments, the media source may comprise or form part of a media distribution system (DS) or broadcast system such as an over-the-air (OTA) broadcast system, DVB system, radio broadcast system, satellite broadcast system, and so forth. The media source may be implemented within a VOD system or interactive television system that allows users to select, receive, and view video content over a network. The media source also may comprise or form part of an IPTV system that delivers digital television content over an IP connection, such as a broadband connection. The embodiments are not limited in this context.

The media processing system 100 may be coupled to the media source through various types of communication channels capable of carrying information signals such as wired communication links, wireless communication links, or a combination of both, as desired for a given implementation. The media processing system 100 also may be arranged to receive media content from the media source through various types of components or interfaces. For example, the media processing system 100 may be arranged to receive media content through one or more tuners and/or interfaces such as an OpenCable (OC) tuner, NTSC/PAL tuner, tuner/demodulator, point-of-deployment (POD)/DVB common interface (DVB-CI), A/V decoder interface, Ethernet interface, PCI interface, and so forth.

The media content delivered to the media processing system 100 may comprise various types of information such as image information, audio information, video information, A/V information, and/or other data. In some implementations, the media source may be arranged to deliver media content in various formats for use by a device such as a STB, IPTV device, VOD device, media player, and so forth.

The media content may be delivered as compressed media content to allow the media processing system 100 to efficiently store and/or transfer data. In various implementations, the media content may be compressed by employing techniques such as spatial compression using discrete cosine transform (DCT), temporal compression, motion compensation, and quantization. Video compression of the media content may be performed, for example, in accordance with standards such as H.264, MPEG-2, MPEG-4, VC-1, and so forth. In some cases, the media content may be delivered as scrambled and/or encrypted media content to prevent unauthorized reception, copying, and/or viewing.

In various embodiments, the media processing system 100 may be arranged to perform motion detection for video processing. The motion detection may be performed while images are being acquired. For example, the media processing system 100 may be implemented within an image acquisition device such as a video camera or mobile device with embedded imaging and may perform motion detection during image acquisition. The motion detection also may be performed after image acquisition to process and view video streams. For example, the media processing system 100 may be implemented by a web-based media server, mobile computing platform, desktop platform, entertainment PC, Digital TV, video streaming enhancement chipset, media player, media editing application, or other suitable visualization device to enhance the viewing experience of digital media.

As shown in FIG. 1, the media system 100 may comprise a motion detection apparatus 102. In various embodiments, the motion detection apparatus 102 may be arranged to perform content dependent motion detection on an input image sequence 104 based on temporal and spatial information. The input image sequence 104 may comprise data derived from or associated with one or more video images. For example, the input image sequence 104 may comprise one or more of image data, video data, video sequences, groups of pictures, pictures, images, regions, objects, frames, slices, macroblocks, blocks, pixels, signals (e.g., Y, U, and V), and so forth. In one or more embodiments, the input image sequence 104 may comprise a plurality of frames including a reference frame and a current frame. A frame may be segmented into blocks comprising associated pixels. The values assigned to pixels may comprise real numbers and/or integer numbers. It can be appreciated that blocks may be grouped into macroblocks, and that a frame may be segmented into smaller regions such as slices.

Figure 2:
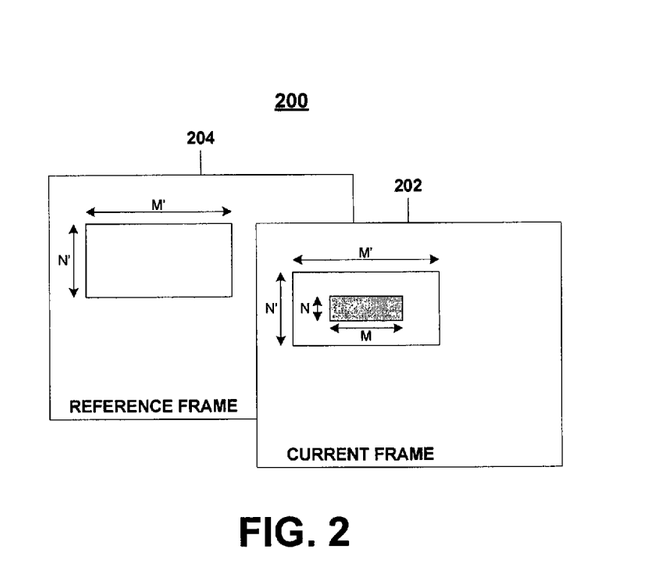
FIG. 2 illustrates a plurality of frames for motion detection in accordance with one or more embodiments.

FIG. 2 illustrates a plurality of frames 200 for motion detection in accordance with one or more embodiments. The motion detection may be performed for the frames 200, for example, by one or more elements of the media processing system 100 illustrated in FIG. 1. The embodiments, however, are not limited in this context.

As shown, the frames 200 may comprise a current frame 202 and a reference frame 204. The reference frame 204 may comprise, for example, a previous frame, a next frame, or average of both. The frames 202, 204 may be segmented into blocks comprising associated pixels. In one or more embodiments, the current frame 202 and the reference frame 204 may comprise M'×N' blocks which are co-located at the current frame 202 and the reference frame 204. The M'×N' block of the current frame 202 may comprise an M×N block used in the computation of a content dependent motion detection value MD.

Referring again to FIG. 1, in one or more embodiments, the motion detection apparatus 102 may be arranged to calculate a motion detection value MD of associated pixels inside of a given block of size M×N, where M≧1 and N≧1 (see e.g., FIG. 2). In various implementations, the content dependent motion detection value MD may based on a temporal difference measurement $D_t$ and a local spatial complexity measurement $D_s$.

The entire M×N block may reside inside of an M'×N' block of a current (c) frame. The content dependent motion detection value MD may be computing using M'×N' blocks co-located at a current (c) frame and a reference (r) frame, where M'≧M, and N'≧N. The reference (r) frame may comprise, for example, a previous frame, a next frame, or average of both.

As illustrated, the motion detection apparatus 102 may comprise a plurality of functional components or modules. The modules may be implemented by one or more chips or integrated circuits (ICs) and may comprise, for example, hardware and/or software such as logic (e.g., instructions, data, and/or code) to be executed by a logic device. Examples of a logic device include, without limitation, a central processing unit (CPU), microcontroller, microprocessor, general purpose processor, dedicated processor, chip multiprocessor (CMP), media processor, digital signal processor (DSP), network processor, co-processor, input/output (I/O) processor, application specific integrated circuit (ASIC), field programmable gate array (FPGA), programmable logic device (PLD), and so forth. Executable logic may be stored internally or externally to a logic device on one or more types of computer-readable storage media such as volatile or non-volatile memory, removable or non-removable memory, erasable or non-erasable memory, writeable or re-writeable memory, and so forth. The modules may be physically or logically coupled and/or connected by communications media comprising wired communication media, wireless communication media, or a combination of both, as desired for a given implementation. In some embodiments, the plurality of modules may be implemented as a system-on-a-chip (SOC) by a single chip or integrated circuit (IC). The embodiments are not limited in this context.

As shown, the motion detection apparatus 102 may comprise a temporal difference module 106. In various implementations, the temporal difference module 106 may be arranged to determine a temporal difference measurement $D_t$. The temporal difference measurement $D_t$ may comprise, for example, a vector norm of a temporal vector $V_t$. The temporal vector $V_t$ may correspond to co-located pixels of co-located blocks in a current (c) frame and a reference (r) frame.

In one or more embodiments, the temporal difference module 106 may let the temporal vector $V_t$ comprise elements c(x, y)−r(x, y), where c(x, y) and r(x, y) represent the pixels at (x, y) of the M'×N' blocks of the current (c) frame and reference (r) frame, respectively. The number of elements of $V_t$ may comprise M'×N'. The number of elements of $V_t$ may comprise less than M'×N', for example, by using the sub-sampled pixels of M'×N'. The temporal difference measurement $D_t$ may be computed as a vector norm of the temporal vector $V_t$ such as L1 (absolute values) and L2 (squared values) according to the equation:

$$D_t = \mathrm{norm}(V_t).$$

The motion detection apparatus 102 may comprise a local spatial complexity module 108. In various implementations, the local spatial complexity module 108 may be arranged to determine a local spatial complexity measurement $D_s$. The local spatial complexity measurement $D_s$ may comprise, for example, a sum of vector norms for a vertical spatial vector $V_{sv}$ and a horizontal spatial vector $V_{sh}$. The vertical spatial vector $V_{sv}$ may correspond to a vertical pixel region of the co-located block in the current (c) frame. The horizontal spatial vector $V_{sh}$ may correspond to a horizontal pixel region of the co-located block in the current (c) frame.

In one or more embodiments, the local spatial complexity module 108 may let the vertical vector $V_{sv}$ comprise elements c(x, y)−c(x, y+2) and may let the horizontal vector $V_{sh}$ comprise elements c(x, y)−c(x+1, y), respectively. In such embodiments, the elements c(x,y), c(x,y+2), and c(x+1,y) are from the current M'×N' block or sub-sampled M'×N' block. Then, the local spatial complexity measurement $D_s$ may be computed using the same norm used for $D_t$ according to the equation:

$$D_s = a \times \mathrm{norm}(V_{sv}) + b \times \mathrm{norm}(V_{sh}) + c, \text{ where a, b, and c are constants.}$$

The motion detection apparatus 102 may comprise a content dependent motion detection module 110. In various implementations, the content dependent motion detection module 110 may be arranged to determine a content dependent motion detection value MD based on the temporal difference measurement $D_t$ and the local spatial complexity measurement $D_s$. In one or more embodiments, the content dependent motion detection value MD may comprise a division of the temporal difference measurement $D_t$ by the local spatial complexity measurement $D_s$. For example, the content dependent motion detection value MD value may be computed according to the equation:

$$MD = \frac{D_t}{D_s},$$

where $D_t$ comprises the temporal difference measurement and $D_s$ comprises the local spatial complexity measurement.

In some embodiments, the content dependent motion detection value MD may be computed without division to reduce computational complexity. For example, an approximated computation of the content dependent motion detection value MD may be performed according to the equation:

$$MD = \begin{cases} (D_t \times Q) \gg f(D_s) & \text{if } f(D_s) \geq 0 \\ (D_t \times Q) \ll -f(D_s) & \text{otherwise,} \end{cases}$$

where Q is a constant, $f(D_s)=\text{int}(\log D_s/\log 2)$, and int( ) is integer rounding towards 0 or +infinity or −infinity. '$\ll$' and '$\gg$' are arithmetic bit shifts to the left and right, respectively. In some hardware implementations, instead of computing log( ), $f(D_s)$ can be implemented by the detection of the number of leading zeros of $D_s$.

The media system 100 may comprise a video processing module 112 coupled to the motion detection apparatus 102. In one or more embodiments, the video processing module 112 may be arranged to receive the motion detection value MD from the motion detection apparatus and to perform various back-end and/or adaptive post-processing operations within the media system 100 such as for de-interlacing, noise reduction, frame rate conversion, and so forth.

It can be appreciated that the embodiment of FIG. 1 illustrates an exemplary implementation, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Figure 3:
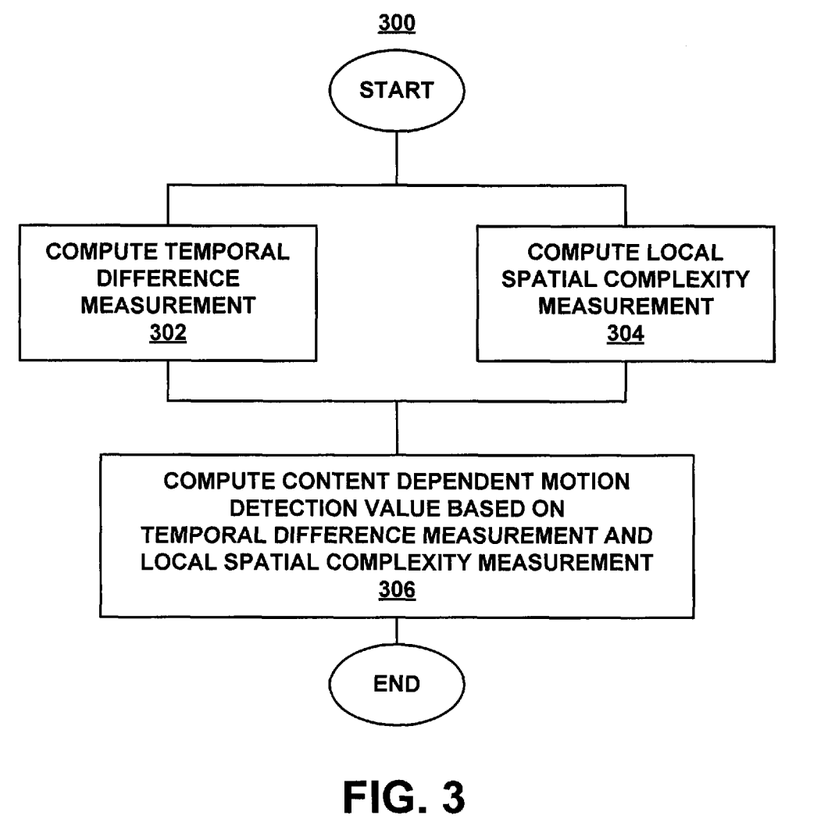
FIG. 3 a logic flow for motion detection in accordance with one or more embodiments.

FIG. 3 illustrates a logic flow 300 for motion detection in accordance with one or more embodiments. The logic flow 300 may be implemented, for example, by one or more elements of the media processing system 100 illustrated in FIG. 1. The embodiments, however, are not limited in this context.

In various embodiments, the logic flow 300 may be performed by various systems, devices, units, and/or components and may be implemented as hardware, software, and/or any combination thereof, as desired for a given set of design parameters or performance constraints. For example, the logic flow 300 may be implemented by one or more logic devices and/or logic comprising instructions, data, and/or code to be executed by a logic device.

The logic flow 300 may comprise computing a temporal difference measurement (block 302). The temporal difference measurement $D_t$ may comprise, for example, a vector norm of a temporal vector $V_t$. The temporal vector $V_t$ may correspond to co-located pixels of co-located blocks in a current (c) frame and a reference (r) frame.

In one or more embodiments, the temporal vector $V_t$ may comprise elements c(x, y)−r(x, y), where c(x, y) and r(x, y) represent the pixels at (x, y) of the M'×N' blocks of the current (c) frame and reference (r) frame, respectively. The number of elements of $V_t$ may comprise M'×N'. The number of elements of $V_t$ may comprise less than M'×N', for example, by using the sub-sampled pixels of M'×N'. The temporal difference measurement $D_t$ may be computed as a vector norm of the temporal vector $V_t$ such as L1 (absolute values) and L2 (squared values) according to the equation:

$$D_t = \text{norm}(V_t).$$

The logic flow 300 may comprise computing a local spatial complexity measurement (block 304). The local spatial complexity measurement $D_s$ may comprise, for example, a sum of vector norms for a vertical spatial vector $V_{sv}$ and a horizontal spatial vector $V_{sh}$. The vertical spatial vector $V_{sv}$ may correspond to a vertical pixel region of the co-located block in the current (c) frame. The horizontal spatial vector $V_{sh}$ may correspond to a horizontal pixel region of the co-located block in the current (c) frame.

In one or more embodiments, the vertical vector $V_{sv}$ comprises elements c(x, y)−c(x, y+2) and the horizontal vector $V_{sh}$ comprises elements c(x, y)−c(x+1, y), respectively. In such embodiments, the elements c(x,y), c(x, y+2), and c(x+1, y) are from the current M'×N' block or sub-sampled M'×N' block. The local spatial complexity measurement $D_s$ may be computed using the same norm used for $D_t$ according to the equation:

$$D_s = a \times \text{norm}(V_{sv}) + b \times \text{norm}(V_{sh}) + c, \text{ where } a, b, \text{ and } c$$
are constants.

The logic flow 300 may comprise computing a content dependent motion detection value based on the temporal difference measurement and the local spatial complexity measurement (block 306). In one or more embodiments, the content dependent motion detection value MD may comprise a division of the temporal difference measurement $D_t$ by the local spatial complexity measurement $D_s$. For example, the content dependent motion detection value MD value may be computed according to the equation:

$$MD = \frac{D_t}{D_s},$$

where $D_t$ comprises the temporal difference measurement and $D_s$ comprises the local spatial complexity measurement.

In some embodiments, the motion detection value MD may be computed without division to reduce computational complexity. For example, an approximated computation of the MD value may be performed according to the equation:

$$MD = \begin{cases} (D_t \times Q) \gg f(D_s) & \text{if } f(D_s) \geq 0 \\ (D_t \times Q) \ll -f(D_s) & \text{otherwise,} \end{cases}$$

where Q is a constant, $f(D_s)=\text{int}(\log D_s/\log 2)$, and int( ) is integer rounding towards 0 or +infinity or −infinity. '$\ll$' and '$\gg$' are arithmetic bit shifts to the left and right, respectively. In some implementations, instead of computing log( ), $f(D_s)$ can be implemented by the detection of the number of leading zeros of $D_s$. The content dependent motion detection value MD may be used to perform various back-end and/or adaptive post-processing operations such as for de-interlacing, noise reduction, frame rate conversion, and so forth.

Figure 4:
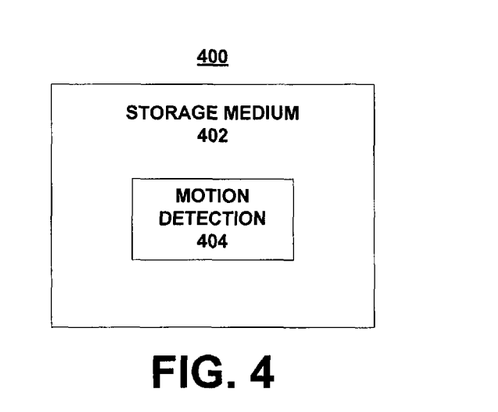
FIG. 4 illustrates an article of manufacture comprising motion detection logic in accordance with one or more embodiments.

FIG. 4 illustrates one embodiment of an article of manufacture 400. As shown, the article 400 may comprise a storage medium 402 to store motion detection logic 404 for performing various operations in accordance with the described embodiments. In various embodiments, the article 400 may be implemented by various systems, components, and/or modules.

The article 400 and/or storage medium 402 may include one or more types of computer-readable storage media capable of storing data, including volatile memory or, non-volatile memory, removable or non-removable memory, erasable or non-erasable memory, writeable or re-writeable memory, and so forth. Examples of a computer-readable storage medium may include, without limitation, random-access memory (RAM), Dynamic RAM (DRAM), Synchronous DRAM (SDRAM), Double-Data-Rate RAM (DDR RAM), DDR SDRAM, static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information.

The article 400 and/or storage medium 402 may store motion detection logic 404 comprising instructions, data, and/or code that, if executed, cause a computer or computer system to perform a method and/or operations in accordance with the described embodiments. Such a computer or computer system may include, for example, any suitable processing platform, computing platform, computing device, processing device, computing system, processing system, processor, or the like, and may be implemented using any suitable combination of hardware and/or software.

The motion detection logic 404 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
 a temporal difference module to compute a temporal difference measurement comprising a vector norm of a temporal vector, the temporal vector corresponding to co-located pixels of co-located blocks in a current frame and a reference frame;

a local spatial complexity module to compute a local spatial complexity measurement comprising a sum of vector norms for a vertical spatial vector and a horizontal spatial vector, the vertical spatial vector corresponding to a vertical pixel region of the co-located block in the current frame, the horizontal spatial vector corresponding to a horizontal pixel region of the co-located block in the current frame;

a content dependent motion detection module to compute a content dependent motion detection value based on the temporal difference measurement and the local spatial complexity measurement; and a processor implementing one or more of the temporal difference module, the local spatial complexity module, and the content dependent motion detection module.

2. The apparatus of claim 1, the local spatial complexity measurement computed according to the equation:

$D_s = a \times norm(V_{sv}) + b \times norm(V_{sh}) + c$, wherein $D_s$ comprises the local spatial complexity measurement, $V_{sv}$ comprises the vertical vector, $V_{sh}$ comprises the horizontal vector, and a, b, and c are constants.

3. The apparatus of claim 1, the local spatial complexity measurement computed using the same norm used for the temporal difference measurement.

4. The apparatus of claim 1, the content dependent motion detection value comprising a division of the temporal difference measurement by the local spatial complexity measurement.

5. The apparatus of claim 1, the content dependent motion detection value comprising an approximated content dependent motion detection value.

6. A system, comprising:
a media source; and
a motion detection apparatus to couple to the media source, the motion detection apparatus comprising:
  a temporal difference module to compute a temporal difference measurement comprising a vector norm of a temporal vector, the temporal vector corresponding to co-located pixels of co-located blocks in a current frame and a reference frame;
  a local spatial complexity module to compute a local spatial complexity measurement comprising a sum of vector norms for a vertical spatial vector and a horizontal spatial vector, the vertical spatial vector corresponding to a vertical pixel region of the co-located block in the current frame, the horizontal spatial vector corresponding to a horizontal pixel region of the co-located block in the current frame;
  a content dependent motion detection module to compute a content dependent motion detection value based on the temporal difference measurement and the local spatial complexity measurement; and
  a processor implementing one or more of the temporal difference module, the local spatial complexity module, and the content dependent motion detection module.

7. The system of claim 6, the local spatial complexity measurement computed according to the equation:

$D_s = a \times norm(V_{sv}) + b \times norm(V_{sh}) + c$, wherein $D_s$ comprises the local spatial complexity measurement, $V_{sv}$ comprises the vertical vector, $V_{sh}$ comprises the horizontal vector, and a, b, and c are constants.

8. The system of claim 6, the local spatial complexity measurement computed using the same norm used for the temporal difference measurement.

9. The system of claim 6, the content dependent motion detection value comprising a division of the temporal difference measurement by the local spatial complexity measurement.

10. The system of claim 6, the content dependent motion detection value comprising an approximated content dependent motion detection value.

11. A method, comprising:
computing a temporal difference measurement comprising a vector norm of a temporal vector, the temporal vector corresponding to co-located pixels of co-located blocks in a current frame and a reference frame;
computing a local spatial complexity measurement comprising a sum of vector norms for a vertical spatial vector and a horizontal spatial vector, the vertical spatial vector corresponding to a vertical pixel region of the co-located block in the current frame, the horizontal spatial vector corresponding to a horizontal pixel region of the co-located block in the current frame; and
computing, by a processor, a content dependent motion detection value based on the temporal difference measurement and the local spatial complexity measurement.

12. The method of claim 11, further comprising computing the local spatial complexity measurement according to the equation:

$D_s = a \times norm(V_{sv}) + b \times norm(V_{sh}) + c$, wherein $D_s$ comprises the local spatial complexity measurement, $V_{sv}$ comprises the vertical vector, $V_{sh}$ comprises the horizontal vector, and a, b, and c are constants.

13. The method of claim 11, further comprising computing the local spatial complexity measurement using the same norm used for the temporal difference measurement.

14. The method of claim 11, further comprising computing the content dependent motion detection value by dividing the temporal difference measurement by the local spatial complexity measurement.

15. The method of claim 11, further comprising approximating the content dependent motion detection value.

16. An article of manufacture comprising a non-transitory computer-readable storage medium containing instructions that if executed by one or more processors enable a system to:
compute a temporal difference measurement comprising a vector norm of a temporal vector, the temporal vector corresponding to co-located pixels of co-located blocks in a current frame and a reference frame;
compute a local spatial complexity measurement comprising a sum of vector norms for a vertical spatial vector and a horizontal spatial vector, the vertical spatial vector corresponding to a vertical pixel region of the co-located block in the current frame, the horizontal spatial vector corresponding to a horizontal pixel region of the co-located block in the current frame; and
compute a content dependent motion detection value based on the temporal difference measurement and the local spatial complexity measurement.

17. The article of manufacture of claim 16, further comprising instructions that if executed enable the system to compute the local spatial complexity measurement according to the equation:

$D_s = a \times norm(V_{sv}) + b \times norm(V_{sh}) + c$, wherein $D_s$ comprises the local spatial complexity measurement, $V_{sv}$ comprises the vertical vector, $V_{sh}$ comprises the horizontal vector, and a, b, and c are constants.

18. The article of manufacture of claim 16, further comprising instructions that if executed enable the system to compute the local spatial complexity measurement using the same norm used for the temporal difference measurement.

19. The article of manufacture of claim 16, further comprising instructions that if executed enable the system to compute the content dependent motion detection value by dividing the temporal difference measurement by the local spatial complexity measurement.

20. The article of manufacture of claim 16, further comprising instructions that if executed enable the system to approximate the content dependent motion detection value.

\* \* \* \* \*